United States Patent [19]

Lin

[11] Patent Number: 5,281,261
[45] Date of Patent: Jan. 25, 1994

[54] INK COMPOSITIONS CONTAINING MODIFIED PIGMENT PARTICLES

[75] Inventor: John W. Lin, Webster, N.Y.

[73] Assignee: Xerox Corporation, Stamford, Conn.

[21] Appl. No.: 576,028

[22] Filed: Aug. 31, 1990

[51] Int. Cl.$^5$ .............................................. C09D 11/02
[52] U.S. Cl. .................................. 106/20 R; 524/817; 524/832; 523/205
[58] Field of Search ................ 106/20, 22, 23, 20 R; 524/817, 832; 523/205

[56] References Cited

U.S. PATENT DOCUMENTS

| | | | |
|---|---|---|---|
| 2,335,505 | 11/1943 | Gessler | 106/20 |
| 2,629,697 | 2/1953 | Langdon et al. | 252/161 |
| 2,913,429 | 11/1959 | Floria | 524/817 |
| 3,687,887 | 8/1972 | Zabiak | 260/29.6 WB |
| 3,705,043 | 12/1972 | Zabiak | 106/20 |
| 3,844,994 | 10/1974 | Vijayendran | 260/22 R |
| 3,846,141 | 11/1974 | Ostergren et al. | 106/22 |
| 3,884,871 | 5/1975 | Herman et al. | 524/817 |
| 3,950,290 | 4/1976 | Drury, Jr. et al. | 524/276 |
| 4,161,405 | 7/1979 | Crivello | 430/280 |
| 4,165,399 | 8/1979 | Germonprez | 427/264 |
| 4,273,847 | 6/1981 | Lennon et al. | 430/106 |
| 4,314,931 | 2/1982 | Hoffend et al. | 523/205 |
| 4,409,039 | 10/1983 | Lepesant et al. | 106/20 |
| 4,409,040 | 10/1983 | Tabayashi et al. | 106/20 |
| 4,421,660 | 12/1983 | Solc nee Hajna | 524/445 |
| 4,508,570 | 4/1985 | Fujii et al. | 106/20 |
| 4,530,961 | 7/1985 | Nguyen et al. | 524/832 |
| 4,597,794 | 7/1986 | Ohta et al. | 106/20 |
| 4,659,773 | 4/1987 | Itoh et al. | 524/817 |
| 4,680,057 | 7/1987 | Hays | 106/23 |
| 4,713,083 | 12/1987 | Okuzono et al. | 106/22 |
| 4,846,893 | 7/1989 | Akasaki et al. | 427/214 |

FOREIGN PATENT DOCUMENTS 59-09376 5/1984 Japan.

OTHER PUBLICATIONS

Xerox Disclosure Journal, V. K. Dunn, "Waterproof Carbon Black Ink for Ink Jet Printing", vol. 4, No. 1, Jan./Feb. 1979.

Primary Examiner—Helene Klemanski
Attorney, Agent, or Firm—Judith L. Byorick

[57] ABSTRACT

Disclosed is an ink composition comprising an aqueous liquid vehicle and pigment particles having attached to the surfaces thereof a polymerized vinyl aromatic salt. In one embodiment, the polymeric vinyl aromatic salt is chemically grafted to the surfaces of the pigment particles; in another embodiment, the polymeric vinyl aromatic salt is adsorbed onto the surfaces of the pigment particles. Preferably, the modified pigment particles have an average particle diameter of less than about 1 micron. The ink composition is suitable for applications such as ink jet printing processes, particularly thermal ink jet printing processes. Images generated with ink compositions of the present invention are sharp, waterfast, lightfast, and of high optical density, exhibiting no feathering, and can be electrically conductive.

40 Claims, No Drawings

INK COMPOSITIONS CONTAINING MODIFIED PIGMENT PARTICLES

BACKGROUND OF THE INVENTION

The present invention is directed to an ink composition containing modified pigment particles as a colorant. More specifically, the present invention is directed to an ink composition comprising a liquid vehicle and pigment particles that have been treated with a vinyl aromatic salt which has been polymerized and attached to the surfaces of the pigment particles either by chemical bonding (grafting) or by adsorption. The ink composition of the present invention is suitable for use in various applications, such as ink for writing pens, inks for conductive coatings and conductive images, and inks for printing and graphic applications. In addition, ink compositions of the present invention are particularly suitable for ink jet printing processes, including thermal ink jet printing processes, acoustic ink jet printing processes, piezoelectric ink jet and continuous ink jet printing processes.

Ink jet printing systems generally are of two types: continuous stream and drop-on-demand. In continuous stream ink jet systems, ink is emitted in a continuous stream under pressure through at least one orifice or nozzle. Multiple orifices or nozzles also can be used to increase imaging speed and throughput. The stream is ejected out of orifices and perturbed, causing it to break up into droplets at a fixed distance from the orifice. At the break-up point, the electrically charged ink droplets are passed through an applied electrode which is controlled and switched on and off in accordance with digital data signals. Charged ink droplets are passed through a controllable electric field which adjusts the trajectory of each droplet in order to direct it to either a gutter for ink deletion and recirculation or a specific location on a recording medium to create images. The image creation is controlled by electronic signals.

In drop-on-demand systems, a droplet is ejected from an orifice directly to a position on a recording medium by pressure created by, for example, a piezoelectric device, an acoustic device, or a thermal process controlled in accordance with digital data signals. An ink droplet is not generated and ejected through the nozzles of an imaging device unless it is needed to be placed on the recording medium.

Since drop-on-demand systems require no ink recovery, charging, or deflection operations, the system is simpler than the continuous stream type. There are three types of drop-on-demand ink jet systems. One type of drop-on-demand system has an ink filled channel or passageway having a nozzle on one end and a regulated piezoelectric transducer near the other end to produce pressure pulses. The relatively large size of the transducer prevents close spacing of the nozzles necessary for high resolution printing, and physical limitations of the transducer result in low ink drop velocity. Low drop velocity may seriously diminish tolerances for drop velocity variation and directionality, thus impacting the system's ability to produce high quality copies, and also decreases printing speed. Drop-on-demand systems which use piezoelectric devices to eject the ink droplets also suffer the disadvantage of a low resolution. A second type of drop-on-demand ink jet device is known as acoustic ink printing which can be operated at high frequency and high resolution. The printing utilizes a focused acoustic beam formed with a spherical lens illuminated by a plane wave of sound created by a piezoelectric transducer. The focused acoustic beam reflected from a surface exerts a pressure on the surface of the liquid, resulting in ejection of small droplets of ink onto an imaging substrate. Aqueous based inks can be used in this system.

The third type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information generate an electric current pulse in a resistive layer (resistor) within each ink passageway near the orifice or nozzle, causing the ink in the immediate vicinity of the resistor to be heated up periodically. Momentary heating of the ink leads to its evaporation almost instantaneously with the creation of a bubble. The ink at the orifice is forced out of the orifice as a propelled droplet at high speed as the bubble expands. When the hydrodynamic motion of the ink stops after discontinuous heating followed by cooling, the subsequent ink emitting process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble nucleation and formation of around 280° C. and above. Once nucleated and expanded, the bubble or water vapor thermally isolates the ink from the heater and no further heat can be applied to the ink. This bubble expands rapidly due to pressure increase upon heating until all the heat stored in the ink in excess of the normal boiling point diffuses away or is used to convert liquid to vapor, which removes heat due to heat of vaporization. The expansion of the bubble forces a droplet of ink out of the nozzle located either directly above or on the side of a heater, and once the excess heat is removed with diminishing pressure, the bubble collapses on the resistor. At this point, the resistor is no longer being heated because the current pulse has been terminated and, concurrently with the bubble collapse, the droplet is propelled at a high speed in a direction towards a recording medium. Subsequently, the ink channel refills by capillary action and is ready for the next repeating thermal ink jet process. This entire bubble formation and collapse sequence occurs in about 30 microseconds. The heater can be reheated to eject ink out of the channel after 100 to 2,000 microseconds minimum dwell time and to enable the channel to be refilled with ink without causing any dynamic refilling problem. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Known ink jet ink compositions generally comprise a dye which is soluble in an ink vehicle such as water or a mixture of water and a water soluble or water miscible organic solvent. The colorant in these inks is a soluble dye rather than a pigment. Inks comprising soluble dyes can exhibit many problems, such as poor waterfastness, poor lightfastness, clogging of the jetting channels as a result of solvent evaporation and changes in the dye's solubility, dye crystallization, ink bleeding when prints are formed on plain papers, poor thermal stability, chemical instability, ease of oxidation, and low drop velocity. In addition, many of the dyes contained in inks may be potentially mutagenic. These problems can be minimized by replacing some of the dyes used in ink formulations with insoluble pigments. In general, pigments have superior properties with respect to dyes, such as good waterfastness, good lightfastness, good image density, thermal stability, oxidative stability, the ability to perform intercolor ink mixing, compatibility with both coated/treated and plain papers, and non-mutagenic properties.

Ink jet inks containing pigment particles as colorants are known. For example, in Dunn, "Waterproof Carbon Black Ink for Ink Jet Printing," Xerox Disclosure Journal, Vol. 4, No. 1 (1979), a waterproof colloidal carbon black ink for ink jet printing is disclosed. The ink is prepared by incorporating a water-resistant acrylic polymer binder into an ink jet ink, such that the ink composition comprises about 9 percent by weight of carbon black, about 2 percent by weight of an anionic polymer-type dispersing agent, about 5 percent by weight of polyethylene glycol, about 8 percent by weight of Carboset 514H, and about 76 percent by weight of ammoniated distilled water. Sufficient ammonium hydroxide is added to the ink to adjust the pH to 8.5. According to the article, this ink composition is particularly suited to ink jets run in a continous mode.

In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly additively polymerizable vinyl groups, into which hydrophilic construction portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 3,705,043 discloses an ink suitable for jet printing which comprises a high infrared absorbing coloring component and a humectant in the form of an aliphatic polyol, alkyl ether derivatives of aliphatic polyols, and mixtures thereof in aqueous media. The infrared absorber component may be a high infrared absorptive water soluble dye, a solution of water dispersed carbon blacks, or mixtures thereof. In addition, U.S. Pat. No. 3,687,887 discloses an ink jet ink having application onto a film base which comprises an aqueous system containing 1 to 5 percent by weight of a dissolved styrene-maleic anhydride resin, 3 to 20 percent by weight of glycol ethers, and up to 4 percent by weight of carbon black in suspension or 1 to 4 percent of orthochromatic dyes in solution, or both, plus additives such as tinting dyes. Example 1 of this patent discloses a general ink formulation containing carbon black and a glycol ether, which may be an ethylene glycol type ether. Further, Japanese Patent 59-93765 discloses a recording liquid for ink jet printers. The ink disclosed therein is designed for dissolution stability at temperatures above 250° C. to prevent damage to the ink jet head, and comprises a dye, a solvent such as water, an organic solvent, an optional surface tension controller, a viscosity controller, and other additives. An amount of C.I. Food Black 2 is used as the colorant, and is present in the liquid in an amount of 0.5 to 15 percent by weight.

U.S. Pat. No. 4,273,847 discloses a printing ink comprising particles of small size, each having a body portion consisting of a fusible resin with a colorant dispersed therein and an electrically conductive material, which may be carbon particles, situated substantially entirely on the surface of the body portion and comprising 5 to 10 percent of the weight of the ink. The disclosed ink is suitable for use in pulsed electrical printing.

Further, U.S. Pat. No. 4,530,961 discloses an aqueous dispersion of carbon black grafted with hydrophilic monomers of alkali or ammonium carboxylate bearing polyacrylates, which suspension may be used for manufacturing ink jet inks. The dispersion has a viscosity of about 2 to about 30 centipoise for a carbon black content of about 1 to 15 percent by weight. This composition may also contain surfactants, wetting agents, dyes, mold inhibitors, oxygen absorbers, buffering agents, pH controlling agents, and viscosity controlling agents. Carbon black particles contained in the composition are of a size that permits them to pass easily through 1 to 50 micron mesh filters. Example 9 of this reference discloses three possible ink compositions containing the carbon black suspension. In addition, at column 1, lines 43 to 46, this patent indicates that it is known to graft hydrophobic styrene onto carbon black.

The use of aromatic sulfonates as surfactants is also known. For example, U.S. Pat. No. 2,629,697, the disclosure of which is totally incorporated herein by reference, discloses a liquid composition comprising sodium alkyl aryl sulfonate, liquid hydrocarbon, and an aliphatic hydroxy compound, and optionally also containing water. The compound is useful as an emulsion type cleaning compound. In addition, U.S. Pat. No. 2,335,505, the disclosure of which is totally incorporated herein by reference, discloses a typographic printing ink vehicle which comprises alkali metal silicates dissolved in mixtures of water with water-miscible organic solvents. The ink can also contain an aromatic ester sulfonate. Further, U.S. Pat. No. 3,844,994, the disclosure of which is totally incorporated herein by reference, discloses an ink formulation useful in lithographic printing processes which is a stable emulsion comprising an oleophilic phase and a hydrophilic phase, comprising one or more polyhydric alcohols, a surfactant, and polystyrene sulfonate.

Additional references of background interest include U.S. Pat. Nos. 3,846,141, 4,165,399, 4,409,039, 4,409,040, and U.S. Pat. No. 4,508,570.

Although known inks are suitable for their intended purposes, a need continues to exist for ink compositions containing pigment particles as colorants. In addition, a need exists for ink compositions wherein pigment particles are stably dispersed in an aqueous medium. A need also exists for ink compositions suitable for ink jet printing. Further, there is a need for ink compositions that generate high quality images on a variety of substrates, including plain and treated papers, transparencies, plastic, and fabric, when employed in ink jet printing processes, including continuous ink jet printing and drop-on-demand processes. There is also a need for ink compositions suitable for use in ink jet printing systems wherein the images generated exhibit excellent image sharpness, lightfastness, waterfastness, and optical density as well as the absence of feathering and the absence of mottling in solid image areas. Further, a need exists for ink compositions that contain conductive pigment particles, wherein images generated with the liquids are electrically conductive and enable preparation of a conductive image or pattern on a nonconductive substrate. A need also exists for ink compositions that are nontoxic and nonmutagenic. There is also a need for ink compositions suitable for ink jet printing that exhibit low viscosities of less than 5 centipoise. Additionally, there is a need for ink compositions containing pigment particles with an average diameter of less than 3 microns, and preferably less than 1 micron. Further, a need remains for ink compositions capable of generating images with optical density of over 1.20 on various plain papers.

SUMMARY OF THE INVENTION

It is an object of the present invention to provide an ink composition containing pigment particles as the colorant.

It is another object of the present invention to provide an ink composition wherein pigment particles are stably dispersed in an aqueous medium.

It is yet another object of the present invention to provide an ink composition suitable for ink jet printing.

It is still another object of the present invention to provide an ink composition that generates high quality images on a variety of substrates when employed in ink jet printing processes, including continuous ink jet printing and drop-on-demand processes.

Another object of the present invention is to provide an ink composition suitable for use in ink jet printing systems wherein the images generated exhibit excellent image sharpness, lightfastness, waterfastness, and optical density as well as the absence of feathering and the absence of mottling in solid image areas.

Yet another object of the present invention is to provide an ink composition that contains conductive pigment particles, wherein images generated with the liquid are electrically conductive and enable preparation of a conductive image or pattern on a nonconductive substrate.

Still another object of the present invention is to provide an ink composition that is nontoxic and nonmutagenic.

It is another object of the present invention to provide an ink composition suitable for ink jet printing that exhibits a low viscosity of less than 5 centipoise.

It is yet another object of the present invention to provide an ink composition containing pigment particles with an average diameter of less than 3 microns, and preferably less than 1 micron.

It is still another object of the present invention to provide an ink composition capable of generating images with optical density of over 1.20 on various plain papers.

These and other objects of the present invention can be achieved by providing an ink composition comprising an aqueous liquid vehicle and pigment particles having attached to the surfaces thereof a polymerized vinyl aromatic salt. In one embodiment, the polymerized vinyl aromatic salt is attached to the pigment particle surfaces by chemical bonding or grafting. In another embodiment, the polymerized vinyl aromatic salt is attached to the pigment particle surfaces by adsorption. Another embodiment of the present invention is directed to a process which comprises incorporating into an ink jet printing apparatus an ink composition comprising an aqueous liquid vehicle and pigment particles having attached to the surfaces thereof a polymerized vinyl aromatic salt, and causing the ink to be ejected in droplets in an imagewise pattern onto a substrate, thereby forming an image.

The ink composition of the present invention comprises modified pigment particles in a liquid vehicle. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as butyl carbitol or cellusolve, amino alcohols, ketones, polyelectrolytes, and other water soluble or water miscible materials, as well as mixtures thereof. When mixtures of water and water soluble or miscible organic liquids are selected as the liquid vehicle, the water to organic ratio typically ranges from about 100:0 to about 40:60, and preferably from about 97:3 to about 50:50. The non-water component of the liquid vehicle generally serves as a humectant which has a boiling point higher than that of water (100° C.). The liquid vehicle should permit an emulsion or a colloidal suspension of the pigment particles in the ink, and should have evaporation characteristics allowing for the desired ink jet printing speed if the ink is to be used in an ink jet printing process. In the ink composition of the present invention, the liquid vehicle is generally present in an amount of from about 80 to about 99.9 percent by weight, and preferably from about 90 to about 99 percent by weight.

Also contained in the ink composition of the present invention are pigment particles. The pigment can be black, cyan, magenta, yellow, red, blue, green, brown, and the like, as well as mixtures thereof. Examples of suitable pigments include various carbon blacks such as channel black, furnace black, lamp black, Raven 5250, Raven 5750, Raven 3500 and other similar carbon black products available from Columbia Company, Regal ® 330, Black Pearl L, Black Pearl 1300, and other similar carbon black products available from Cabot Company, Degussa carbon blacks such as Derussol carbon black dispersions available from Degussa Company, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanennt Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Particularly preferred pigment particles are nonmutagenic and nontoxic carbon black particles with a polyaromatic hydrocarbon content of less than about 1 part per million.

The average pigment particle diameter is from about 0.001 to about 10 microns; the particle size should be as small as possible, preferably less than about 3 microns and more preferably less than about 1 micron, to enable a stable colloidal suspension of the particles in the liquid vehicle and to prevent unnecessary clogging of the ink channels when the ink is used in an ink jet printer having small orifice nozzles. Reduced particle size can be obtained by various processes, such as ball milling, roll milling, paintshaking, mechanical attrition, precipitation, acid pasting, and the like. Additional steps of centrifugation and filtration subsequent to treatment of the pigment particles with a vinyl aromatic salt or subsequent to mixing of the ink ingredients can assure small pigment particle size. Pigment particles to which a polymeric vinyl aromatic salt have been attached can be present in the ink composition of the present invention in any effective amount, typically from about 0.1 to about 15 percent by weight of the ink, and preferably from about 0.5 to about 8 percent by weight of the ink.

The ink composition of the present invention also contains a polymerized vinyl aromatic salt attached to the surfaces of the pigment particles. The pigment in the ink composition of the present invention is modified and contains a polymerized vinyl aromatic salt in the form of either a homopolymer or a copolymer (when a different monomer is used together with the vinyl aromatic salt monomer) which is absorbed onto or chemically attached to the surfaces of the pigment particles. Vinyl aromatic salts suitable for the ink composition of the present invention contain a hydrophobic moiety such as a substituted or unsubstituted aromatic group, including phenyl, naphthyl, anthracenyl, and the like, which group has a strong affinity or attraction toward the aromatic functional groups of organic pigments such as carbon blacks, phthalocyanine derivatives, anthraquinone derivatives, and other pigments containing 1 or more aromatic groups. The aromatic groups of the vinyl aromatic salt provide the needed hydrophobicity for strong absorption onto the pigment surface. The vinyl aromatic salts also contain a hydrophilic moiety which can ionize in an aqueous liquid vehicle to form ionic charges on the pigment particles and thus result in a stable pigment dispersion. Further, the vinyl aromatic salts generally contain a polymerizable olefinic group allowing a chemical reaction or polymerization reaction to occur near the pigment particle surface to form a chemical bond between the polymerized vinyl aromatic salt and the pigment particle surface. Alternatively, instead of becoming chemically bonded or grafted to the pigment particle surfaces, the resulting polymerized vinyl aromatic salt can be absorbed onto the pigment surface as a result of similar hydrophobicity of the aromatic groups on the pigment particles and in the structure of the polymeric vinyl aromatic salt. The pigment particles thus modified exhibit a high degree of colloidal stability in an aqueous medium through ionic charge interaction and steric hindrance.

Vinyl aromatic salts generally have the following chemical structure:

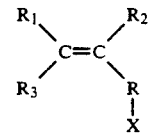

Generally, R is an aromatic moiety, typically with from 6 to about 20 carbon atoms, and includes phenyl, substituted phenyl, naphthyl, substituted naphthyl, anthracenyl, substituted anthracenyl, heterocyclic aromatic rings such as substituted and unsubstituted pyridinyl, quinolinyl, and the like, and X is an acid salt functional group consisting of both cation and anion moieties. Examples of cations include alkali metal ions such as $Rb^+$, $Cs^+$, $K^+$, $Na^+$, or $Li^+$, organic substituted and unsubstituted ammonium ions, including ammonium, phenyl ammonium, alkyl substituted ammonium ions such as methyl ammonium, dimethyl ammonium, ethyl ammonium, diethyl ammonium, tetramethyl ammonium, tetraethyl ammonium, trimethyl ammonium, triethyl ammonium, and the like. Examples of anions include sulfonate, carboxylate, phosphate, borate, and the like; sulfonate anions are preferred. The aromatic functional group of the monomer is hydrophobic, which is desirable because it provides for affinity between the monomer and the pigment, which is important both in the situation where the monomer is polymerized and chemically bonded to the pigment and in the situation where the monomer is polymerized and the polymer is adsorbed onto the pigment surface. The anionic moiety also enhances homogeneous distribution of the monomer in an aqueous medium to provide the grafted pigment with good colloidal stability through ionic charge repulsion. The polymerizable olefinic or vinyl group substituents $R_1$, $R_2$, and $R_3$ are independently selected from hydrogen, alkyl groups, typically with from 1 to about 20 carbon atoms, aromatic groups, typically with from 6 to about 20 carbon atoms, such as phenyl, and the like. Examples include vinyl ($R_1$, $R_2$, and $R_3$ are all hydrogen), methyl vinyl (for example, $R_1$ is $-CH_3$, $R_2$ and $R_3$ are hydrogen), ethyl vinyl (for example, $R_1$ is $-C_2H_5$, $R_2$ and $R_3$ are hydrogen), propyl vinyl (for example, $R_1$ is $-C_3H_7$, $R_2$ and $R_3$ are hydrogen), phenyl vinyl (for example, $R_1$ is $-C_6H_5$, $R_2$ and $R_3$ are hydrogen), butadienyl (for example, $R_1$ is $-C_4H_5$, $R_2$ and $R_3$ are hydrogen), and the like. Heterocyclic groups are also suitable, such as pyridinyl and the like (for example, $R_1$ is $-C_5H_4N$, $R_2$ and $R_3$ are hydrogen). The aromatic group or groups typically have from about 6 to about 20 carbon atoms, such as acenapthalene (a cyclic aromatic group), methoxy phenyl, carbazyl, quinolinyl, phenothiazinyl, and the like. One example of a suitable vinyl aromatic salt is sodium para-styrene sulfonate, which is of the formula shown above wherein R is phenyl ($-C_6H_4-$), X is a sodium sulfonate salt moiety $Na^+SO_3^-$, and the olefinic group has three hydrogen substituents. This material is commercially available from Polyscience Inc., Warrington, Penn. Vinyl aromatic salts can also be prepared by sulfonation of the corresponding vinyl compound by any suitable method, such as by reaction with sulfonyl chloride ($SO_2Cl_2$), a sulfonate compound, sulfuric acid, or the like, followed by reaction with a base, such as KOH, NaOH, $NH_4OH$, LiOH, or the like to result in the vinyl aromatic salt monomer. Reactions for the sulfonation of aromatic groups are well known, and are described in, for example, L. F. Fieser, *Experiments in Organic Chemistry*, (Boston, 3rd ed., 1955) page 144, the disclosure of which is totally incorporated herein by reference.

The monomeric salt can be polymerized either alone to form a homopolymer or together with another monomer having a polymerizable double bond, such as olefins, substituted olefins, vinyl sulfonate, vinyl ether, styrene, or the like to form a copolymer containing the aromatic salt. Further, the monomeric salt can be copolymerized with a vinyl aromatic sulfonic acid salt, such as sodium, potassium, lithium, ammonium, or the like, salts of moieties such as p-vinyl benzoic acid, styrene sulfonic acid, vinyl naphthalene sulfonic acid, vinyl anthracene sulfonic acid, vinyl carbazole sulfonic acid, or the like, to form a copolymer. The resulting copolymer should be soluble or capable of forming a stable dispersion in the liquid vehicle selected for the ink composition.

The vinyl aromatic salt can be polymerized by placing the monomers in an aqueous system in the presence of fine pigment particles to be modified and a water soluble free radical initiator, such as sodium, potassium, or ammonium persulfate salts, diisopropylbenzene monohydroperoxide, azoisobutylaramine.2HCL and its adducts, hydroperoxide (HOOH), alkylhydroperoxide (ROOH, wherein R is alkyl), or the like in an inert environment such as vacuum, nitrogen, helium, argon, or the like, either with or without a dispersing agent such as sodium lauryl sulfate, Igepal CO-530, or the like. The polymerization reaction rate is controlled by many factors, including the reactivity of the polymerizable monomers, polymerization temperature, concentrations of impurities, chain termination substance, free radical initiator (or catalyst) concentration, reaction time, and the like. Chemical modification of the pigment particles can be achieved either by first forming pigment radicals which then react with the monomeric salts through a polymerization process or by first polymerizing the monomeric salt to give a propagating polymeric radical chain which can subsequently be terminated with surface functional groups on the pigment particles. For example, the free radical initiator can polymerize the monomer, and the resulting polymeric salt is then terminated with any reactive functional group of a pigment, such as phenoxy, amino, thiol, sulfide, or the like to form a chemically modified pigment. Alternatively, the free radical initiator can react with the pigment to form a pigment radical which then either polymerizes the vinyl aromatic salt or terminates with a propagating oligomer containing the modifying monomer. When polymerization of the vinyl aromatic salt is terminated onto the pigment surface, the polymerized salt becomes chemically bonded or grafted onto the pigment particle surface. When polymerization is not terminated onto the pigment surface, the polymeric salt is adsorbed onto the pigment surface as a result of the hydrophobic affinity of its aromatic moiety toward the pigment particles.

The attached polymeric salt functions as a dispersing agent or a stabilizing agent for the pigment particle and enhances its colloidal stability in an aqueous medium. The modified pigment particles generally comprise pigment in an amount of from about 5 to about 99 percent by weight of the modified particles, and preferably from about 10 to about 90 percent by weight of the modified particles, and the polymer in an amount of from about 1 to about 95 percent by weight of the modified particles, and preferably from about 10 to about 90 percent by weight of the modified particles. The modified particles are generally present in the ink composition of the present invention in an amount of from about 0.01 to about 15 percent by weight, and preferably from about 1 to about 10 percent by weight.

The ink composition of the present invention can also contain a dye colorant in addition to the pigment. When a pigment is used as the sole colorant, the color of the formed print on a substrate is limited by the color of the pigment. When modification of the color of the images created by the pigmented ink is desired, a dye or a mixture of dyes soluble in the liquid vehicle of the ink composition can be used in conjunction with the pigment. Color balance and optimum optical density of images can be achieved by selecting an appropriate dye system and a particulate pigment system as colorants in the ink formulation. Suitable dyes include Food dyes such as Food Black No. 2, Food Red No. 40, Food Blue No. 1, Food Yellow No. 7, and the like, FD & C dyes, tetrasulfonic acid salts of phthalocyanine derivatives, including copper phthalocyanine derivatives, tetra sodium salts, tetra ammonium salts, tetra potassium salts, tetra lithium salts, and the like, Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodagaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); and the like. The dye or mixture of dyes generally is soluble in the liquid vehicle, and is present in any effective amount. Typically the dye is present in an amount of from 0 to about 15 percent by weight, and preferably from 0 to about 10 percent by weight.

Other additives can also be present in the ink composition of the present invention. For example, the colloidal stability of the modified pigment particles can be further enhanced by the addition of one or more dispersing agents or surfactants or wetting agents to the ink. These additives can be of the cationic, anionic, or nonionic types. Suitable surfactants, dispersing agents, and wetting agents include copolymers of naphthalene sulfonic acid salt and formaldehyde, including Daxad ® 11, 11KLS, 19, 19K, and the like available from W. R. Grace & Company, the Lomar ® D series available from Diamond Shamrock Corporation, vinyl aromatic salts available from Polyscience Company, Tamol ® SN, Tamol ® LG, the Triton ® series available from Rohm and Hass Company, the Igepal ® series available from GAF Company, the Tergitol ® series, water compatible solvents such as ethylene glycol and the like, and other commercially available surfactants. These surfactants, dispersing agents, and wetting agents are generally present in amounts of from 0 to about 40 percent by weight of the pigment, and preferably from 0 to about 30 percent by weight of the pigment. The surfactants or dispersing agents or wetting agents coat or adsorb onto the surfaces of the pigment particles which are not occupied by the vinyl aromatic salt to create electrically charged species, and also provide steric hindrance to separate the pigment particles, thereby enabling an even more stable colloidal dispersion.

Polymeric additives can also be added to the inks of the present invention to enhance the viscosity of the ink composition and the stability of the pigment particles and to reduce the rate of agglomeration and precipitation of the particles. Water soluble polymers such as Gum Arabic, polyacrylate salts, polymethacrylate salts, polyvinyl alcohols, polyethylene oxides, poyethylene glycols, polypropylene glycols, hydroxy propylcellulose, hydroxyethylcellulose, polyvinylpyrrolidinone, polyvinylether, starch, polyacrylamide, lignin sulfonate salts, copolymers of naphthalene sulfonate salts and formaldehyde, polysaccharides, and the like are particularly useful for stabilizing pigment particles in a water based liquid vehicle such as water or a mixture of water and a water miscible organic liquid. Polymeric stabilizers can be present in the ink composition of the present invention in an amount of from 0 to about 10 percent by weight, and preferably from about 0 to about 5 percent by weight.

Other optional additives to the ink composition of the present invention include biocides, such as Dowicil 150, 200, and 75, benzoate salts, sorbate salts, and the like, present in an amount of from about 0.0001 to about 4 percent by weight, and preferably from about 0.01 to about 2.0 percent by weight, humectants, such as ethylene glycol, diethylene glycol, propylene glycol, N-methylpyrrolidinone, hydroxyethers, ethers, amides, cyclic amides, sulfones, sulfoxides, ketones, lactones, esters, alcohols, and the like, present in an amount of from 0 to about 70 percent by weight, and preferably from about 3 to about 40 percent by weight, antioxidants, including derivatives of phenols such as BHT, 2,6-di-t-butylphenol, and the like, tocopherol derivatives such as Vitamin E and the like, aromatic amines, alkyl and aromatic sulfides, and the like, present in an amount of from 0 to about 10 percent by weight, and preferably from 0 to about 5 percent by weight, pH controlling agents, including acids such as acetic acid, phosphoric acid, boric acid, sulfuric acid, nitric acid, hydrochloric acid, and the like, bases such as potassium hydroxide, sodium hydroxide, lithium hydroxide, ammonium hydroxide, trimethylamine, ethanolamine, morpholine, triethanolamine, diethanolamine, and the like, phosphate salts, carboxylate salts, sulfite salts, amine salts, and the like, present in an amount of from 0 to about 10 percent by weight, and preferably from about 0.001 to about 5 percent by weight, drying accelerating agents, such as sodium lauryl sulfate, N,N-diethyl-m-toluamide, cyclohexylpyrrolidinone, butylcarbitol, and the like, present in an amount of from about 0.001 to about 5 percent by weight, and preferably from about 0.01 to about 3 percent by weight, surface tension modifiers, such as sodium lauryl sulfate, sodium octyl sulfate, and the like, present in an amount of from 0 to about 10 percent by weight, and preferably from 0 to about 5 percent by weight, ink penetrants, such as alcohols, sodium lauryl sulfate, esters, ketones, and the like, present in an amount of from about 0.001 to about 15 percent by weight, and preferably from about 0.001 to about 10 percent by weight, and additives for improving waterfastness and lightfastness, such as polyethyleneimine, ethylene and propylene oxide modified polyethyleneimine, and the like, present in an amount of from 0 to about 10 percent by weight, and preferably from 0 to about 5 percent by weight. The viscosity of the recording fluid generally is from about 1 to about 10 centipoises (measured at 25° C.) and preferably is less than about 3 centipoises.

The pigment modification of the present invention can be prepared by mixing the selected pigment or mixture of pigments with the selected monomeric vinyl aromatic salt of this invention in water (preferably distilled or deionized). Optionally, a wetting agent such as those of the Daxad ® series of W. R. Grace (Daxad ® 19, 19K, 11, 11Kls), and the like, those of the Lomar ® series, including Lomar ® D, Lomar ® W, and the like, those of the lgepal series, such as lgepal ® CO 540, Co-560, and the like, those of the Tamol ® series, such as Tamol SN, and the like, those of the Triton ® series, such as Triton 100 and the like, vinyl aromatic salts such as sodium para-styrene sulfonate and the like, and organic liquids such as glycol derivatives, including ethylene glycol, diethyleneglycol, polyethylene glycol, polypropylene glycol, and the like, may be present in the mixture in an amount of from about 0.1 to about 50 percent by weight to wet the pigment in an aqueous medium. Wetting enables the pigment to break apart to form a homogeneous aqueous dispersion ready for modification. This mixture is then attrited, for example, by placing it in a ball mill, generally at low temperatures of from about 1 to about 40° C., which temperature can be maintained with external cooling, such as by surrounding with a jacket containing a circulating coolant such as water or any other suitable liquid at the appropriate temperature, which is generally cooler than room temperature and warmer than about 0° C. The cooling is especially desirable when the monomeric vinyl aromatic salt is used to disperse the pigment without causing it to polymerize or be terminated prematurely. The attrition can be performed in air or under an inert atmosphere. Attrition generally continues for a period of from about 0.25 to about 48 hours, which results in reduction of the pigment particle size to a desirable range of from about 0.0010 to about 20 microns in average particle diameter.

Subsequent to attrition, a water soluble free radical polymerization initiator such as potassium persulfate, hydrogen peroxide, alkyl hydroperoxides, azoisobutyrylnitrile derivatives, azoisobutyrylamine.2HCl derivatives, or the like is added to the mixture in an amount of from about 0.001 to about 40 percent by weight based on the amount of the vinyl aromatic salt employed. The amount of initiator added is determined according to the desired chain length of the monomer to be grafted onto the pigment, the impurities in the pigment and the system. For example, larger amounts of initiator present in the system generally result in formation of lower molecular weight, relatively short chain polymers, whereas smaller amounts of initiator generally result in formation of higher molecular weight, relatively long chain polymers. Similarly, when few or no impurities are present in the mixture, generally a lesser amount of initiator is required than when impurities are present in the mixture, since the impurities may tend to terminate the chains of the polymers being formed. The polymerization can be carried out under either vacuum or inert atmosphere, generally for from about 0.25 to about 48 hours depending on polymerization conditions, monomer reactivity, and the impurity level of the system. For example, systems containing relatively small amounts of initiator and/or relatively high amounts of impurities will require longer reaction times than systems containing larger amounts of initiator and/or few or no impurities. Depending on the reaction conditions, the degree of polymerization (i.e. the number of monomer units connected together in the polymer chains( of the grafted material can vary. The polymerization process can be carried out by different methods. For example, the monomer can be mixed with the pigment together in a milling step. The free radical initiator and additional monomer, if necessary, can then be added to the milled pigment dispersion to allow polymerization to take place. Alternatively a two-stage polymerization process can be employed to modify the pigment. In this process the vinyl aromatic salt monomer can be partially polymerized first with a free radical initiator, followed by addition of the pigment to be modified to the partially polymerized mixture together with additional monomer and free radical initiator, if necessary, to provide further reaction and grafting. In another variation of the two-stage polymerization process, the vinyl aromatic salt is first polymerized in the presence of a pigment with a free radical initiator, and additional needed monomer and free radical initiator are added later to the reaction mixture in the second stage of polymerization. It is desirable to distribute the polymerized vinyl aromatic salt evenly throughout the surfaces of the pigment particles. A high degree of polymerization may selectively modify only a portion of the pigment particles, causing uneven distribution of the vinyl aromatic salt among the particles and possibly leading to a high viscosity for the later fabricated ink composition. A very low degree of polymerization may lead to poor pigment stability. It is believed that the optimum degree of polymerization (i.e., the optimum number of monomer units in each polymer) is from about 2 to about 150. Typical polymerization reaction temperatures generally range from about 20° C. to about 120° C., although the temperature can be outside of this range.

After the polymerization has been completed, impurities, unwanted byproducts, and excess starting materials are removed by washing the modified pigment particles with distilled or deionized water, followed by centrifugation (preferably at from about 1000 to about 9000 R.P.M.) and removal of the supernatant liquid to isolate the modified pigment. This process is repeated as many times as necessary, usually from about one to five times, to remove unwanted ionic impurities. After the purification, the modified pigment particles are mixed thoroughly (either with or without sonification) with a desired liquid vehicle which contains all the components of the desired ink composition, such as water, humectant, surfactant, biocide, buffering agent, anti-oxidation agent, dispersing agent, pH modifier, and the like.

The mixture may then optionally be sonified or homogenized by using an ultrasonic device such as a Bronson sonifier (sonicator) model 450 equipped with a ½ inch tip to assure uniform dispersion of the ingredients within the ink composition. Subsequently, the ink can be centrifuged at high speeds of from about 1000 to about 7000 R.P.M. for from about 5 to about 90 minutes to remove unstabilized pigment particles (or poorly grafted pigment particles or large pigment particles). After centrifugation, the ink is decanted and can be filtered through a filter either with or without pressure, wherein the filter has a pore size of less than 10 microns, and preferably less than 1.2 microns (including 0.8 micron, 0.65 micron, 0.45 micron, 0.22 micron, 0.1 micron, 0.05 micron and 0.025 micron) to remove large particles and to achieve good colloidal stability.

The present invention also includes a process for generating printed images with an ink jet printer. The process comprises incorporating the ink composition disclosed herein into an ink jet printing apparatus and causing droplets of the ink to be ejected in an imagewise pattern onto a suitable substrate, thereby generating images on the substrate. Any ink jet apparatus described previously, including continuous type and drop-on-demand type, may be employed to generate images with the ink compositions of the present invention. The ink composition of the present invention may be used to form images on a wide variety of substrates, including plain papers such as Xerox ® 4024 papers, including Ashdown 4024 DP, Cortland 4024 DP, Champion 4024 DP, Xerox ® 4024 D.P. green, Xerox ® 4024 D.P. pink, Xerox ® 4024 D.P yellow, and the like, Xerox ® 4200 papers, Xerox ® 10 series paper, canary ruled paper, ruled notebook paper, bond paper such as Gilbert 25 percent cotton bond paper, Gilbert 100 percent cotton bond paper, and Strathmore bond paper, silica coated papers such as Sharp Company silica coated paper, JuJo paper, and the like, transparency materials such as Xerox ® 3R3351, Tetronix ink jet transparencies, Arkright ink jet transparencies, and the like, fabrics, textile products, plastics, polymeric films, inorganic substrates such as metals and wood, and the like.

Ink compositions of the present invention exhibit significant advantages, particularly when employed in ink jet printing processes. For example, images generated with the inks of the present invention typically exhibit high lightfastness, generally in excess of about 95 percent, exhibit high waterfastness, generally in excess of about 95 percent, exhibit high optical density, generally from about 1.0 to about 1.45 optical density units on plain paper substrates and from about 1.2 to about 1.78 optical density units on silica coated papers, and exhibit high resolution, with resolutions of 300 spots per inch and greater being easily obtained. The advantages of high waterfastness, high lightfastness, and high resolution are all obtainable on plain paper substrates.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

IA. Preparation of Pigment Dispersion Prior To Polymerization

Carbon black (Raven® 5250 bead form, obtained from Columbia Chemical Company, 60 grams), sodium para-styrene sulfonate salt (monomer, also functioning as a wetting agent for carbon black, obtained from Polyscience Company, 12 grams), and distilled water (228 grams) were added portionwise to an attritor (Union Process Company Model OV-1 equipped with a cooling jacket to remove heat) containing 1500 grams of ⅛ inch in diameter stainless steel shot while milling. The attritor was operated at 53 to 55 Volts. After milling for about 8 hours, the pigment dispersion was removed from the attritor with portionwise water dilution (total 120 grams of distilled water added to remove the dispersion, resulting in recovery of 400 grams (95% recovery yield) of the carbon black pigment dispersion in water containing the monomeric sodium parastyrene sulfonate salt.

IB. Polymerization Process and Treatment of Pigment Dispersion

To a three-necked flask equipped with a magnetic stirrer, a thermometer, a gas bubbler, a dropping funnel, and connections to vacuum and inert gas lines were added 112 grams of the carbon black pigment dispersion prepared in IA (containing 16 grams of carbon black and 3.2 grams of monomer) and a vinyl aromatic salt monomer (sodium para-styrene sulfonate) solution (1.6 grams of monomer in 10 grams of distilled water). A free radical initiator solution of potassium persulfate (1.57 grams in 40 milliliters of distilled water) was introduced through the dropping funnel. The flask was then evacuated and purged with argon several times to remove air and was finally filled with argon. The mixture was allowed to polymerize in an oil bath at 70° C. (controlled by a temperature control unit) overnight (about 16 hours) followed by heating the mixture to reflux for 2 hours. The resulting dispersion of carbon black having grafted thereto the polymerized sodium para-styrene sulfonate was then allowed to cool to room temperature under an inert atmosphere. Subsequently, the pH of the pigment dispersion was adjusted from 1.86 to 7.2 by the addition of 0.5 Molar potassium hydroxide solution. The dispersion was then centrifuged at 5500 R.P.M. for 30 minutes and the supernatant containing unreacted monomer byproducts and undesired water soluble materials was removed from the solid pigment. Thereafter, the pigment was redispersed in distilled water and centrifuged at 5500 R.P.M. for 1 hour, after which the supernatant containing unwanted electrolytes, unwanted monomer and impurities was removed from the pigment by decantation. Subsequently, 16 grams of the purified modified carbon black was then added to 152 grams of distilled water to result in a dispersion (168 grams) of the modified pigment.

IC. Ink Preparation

To 84 grams of the modified pigment dispersion prepared in IB was added with stirring ethylene glycol (40 grams), biocide (Dowicil 200, 0.08 grams), 3.2 grams of a 20 percent by weight of sodium lauryl sulfate solution in water (prepared with Duponol Me Dry obtained from DuPont Company; 3.2 grams of solution contained 0.64 gram of the solid sodium lauryl sulfate), and distilled water (37.7 grams). The resulting ink mixture was agitated and homogenized with a Bronson sonicator (also known as a sonifier) equipped with a ½" tip for 10 minutes. Subsequently, the liquid mixture was centrifuged for 30 minutes at 5500 R.P.M. and the suspended ink was decanted and filtered easily through 5 micron and 3 micron filters. The ink composition exhibited a viscosity of 4.19 centipoises (c.p.) measured at 25° C.

ID. Generation of Prints

The ink composition prepared in IC was incorporated into an ink cartridge in a thermal ink jet printing test fixture equipped with a 48 jet printhead (about 300 spots per inch resolution). The voltage applied to the heater was in the range of 30 to 42 volts, with a pulse length of 2 to 3 microseconds. The ink reservoir containing the ink prior to ejection from the printhead was maintained at a temperature from 10° to 60° C. during the imaging process. Very good images were obtained on plain papers including Xerox 10 series paper and Xerox letterhead paper with this thermal ink jet printing device. Specifically, the images exhibited excellent waterfastness after they were dried, exhibited excellent lightfastness comparable to that obtained with images generated by xerographic processes, exhibited high optical densities, and had sharp images with little or no feathering. In addition, the ink was jetted from the test fixture to generate images even after the fixture containing the ink had been allowed to remain idle for 100 seconds at 15 percent relative humidity.

EXAMPLE II

An ink composition was prepared by mixing together 84 grams of a dispersion of modified pigment particles prepared as described in IB above, biocide (Dowicil 200, 0.08 gram), propylene glycol (40 grams), distilled water (32.7 grams) and 3.0 grams of a solution of sodium lauryl sulfate in water (containing 20 percent by weight of sodium lauryl sulfate). The resulting ink mixture was sonicated for 10 minutes and centrifuged at 5500 R.P.M. for 30 minutes. Subsequently, the ink was decanted and filtered easily through 5 micron and 3 micron membrane filters. Thereafter, a dispersing agent (Daxad 19K, 3.0 grams of a 20 percent solution in water containing a total of 0.6 gram of the solid dispersing agent) was added to the ink mixture and the ink was sonicated for 10 minutes, resulting in an ink containing about 3.7 percent by weight of carbon black pigment particles having attached thereto a polymerized vinyl aromatic salt.

EXAMPLE III

An ink composition was prepared by mixing together 40 grams of an ink prepared as described in IC above and a dispersing agent (Daxad 19K, a copolymer of sodium naphthalene sulfonate and formaldehyde, 0.084 gram of dispersing agent in 0.75 grams of water). The resulting ink was sonicated for 10 minutes, cooled, and filtered through a 3 micron membrane filter, resulting in an ink with a viscosity of 1.99 c.p.

EXAMPLE IV

IVA. Pigment Modification (In situ polymerization of vinyl aromatic salt in the presence of pigment)

To a 500 milliliter three-necked flask equipped with a stirrer, a thermometer, a gas bubbler, and connections to vacuum and argon lines was added 105 grams of a pigment dispersion prepared according to the method of Example IA above, sodium para-styrene sulfonate salt (1.5 grams in 10 milliliters of water), and potassium persulfate (free radical initiator, 1.18 grams in 20 milliliters of distilled water). The pigment mixture containing the monomer initiator was degassed several times by vacuum evacuation and refilling with argon. Subsequently, the pigment mixture was slowly heated to 70° C. and held at that temperature overnight (15 hours) and was then heated to reflux temperature for 1 hour. Thereafter, the mixture was cooled in an inert atmosphere and the mixture was adjusted from pH=2.04 to pH=7.3 by the addition of a potassium hydroxide (0.5 Molar) solution. The mixture was then centrifuged and the modified pigment (50.3 grams) was isolated from the aqueous liquid which contained byproducts, unpolymerized monomer, and unused initiator. Subsequently, the modified pigment was dispersed in 300 grams of distilled water, centrifuged, and isolated to result in purified modified pigment particles, which were thereafter redispersed in distilled water to form 217.8 grams of a pigment dispersion suitable for ink preparation.

IVB. Ink Preparation

To 108.9 grams of the chemically modified pigment dispersion prepared in IVA above was added ethylene glycol (37.5 grams), Dowicil 200 (0.075 gram), and 3.75 grams of a 20 percent solution of sodium lauryl sulfate (Duponol Me Dry) in water. The resulting ink was sonicated for 10 minutes and then centrifuged at 5500 R.P.M. for 30 minutes. The suspended liquid pigment mixture was then decanted and filtered through a 1.2 micron filter to result in an ink containing about 4.5 percent by weight of carbon black pigment particles having attached thereto a polymerized vinyl aromatic salt. The visicosity of this ink measured at 25° C. was 2.17 c.p.

IVC. Preparation of an Additional Ink

A copolymer of potassium naphthalene sulfonate and formaldehyde (Daxad 19K, 0.171 gram) was added with stirring to 20 grams of the ink prepared in IVB above. The resulting ink was filtered easily through a 0.65 micron membrane filter to result in an ink composition.

EXAMPLE V

A nonionic surfactant (or dispersing agent), Igepal CO-630 (0.09 gram, obtained from GAF Corporation) was added to 20 grams of an ink prepared as described in Example IVB above to result in an ink with a viscosity of 3.18 c.p. at 25° C.

EXAMPLE VI

Ink Preparation Via a Two Stage Polymerization Process For Pigment Modification

VIA. Preparation of Pigment Dispersion

A carbon black pigment dispersion was prepared by milling Raven ® 5250 bead form (60 grams, obtained from Columbia Chemical Company), sodium para-styrene sulfonate salt (a monomer which was also used as a wetting agent in dispersing the pigment, 12 grams), and distilled water (283 grams) in an attritor (Union Process Company modified Model OV-1) equipped with a water cooling jacket and 1500 grams of ⅛ inch in diameter stainless steel shot for 8 hours. After milling, the pigment dispersion was removed from the attritor and diluted by the addition of 85 milliliters of distilled water. A pigment dispersion (406.5 grams) containing 13.6 percent by weight carbon black was obtained, wherein the carbon black particles contained 27 percent by weight of vinyl aromatic salt monomer.

VIB. Modification of Pigment Particles by a Two Stage Polymerization of a Vinyl Aromatic Salt Monomer To a three-necked flask equipped with a stirrer, a dropping funnel, a thermometer, a gas bubbler, and vacuum and argon lines was added sodium para-styrene sulfonate salt (3.0 grams), distilled water (30 milliliters), and potassium persulfate ($K_2S_2O_8$, free radical initiator, 0.787 gram). The initiator to monomer ratio was 26.2 percent by weight (first stage of polymerization mixture). The mixture was stirred thoroughly to form a homogeneous solution. Pigment dispersion prepared as described in Example VIA (115.5 grams) and potassium persulfate initiator solution (0.826 gram initiator in 30 grams distilled water) were placed in the dropping funnel. The entire system was evacuated, degassed, and purged several times with argon, and the monomer mixture in the three-necked flask was heated to 70° C. and held at that temperature for 90 minutes to polymerize part of the monomer (first stage of polymerization) to an oligomeric polystyrene sulfonate salt. Subsequently, the pigment dispersion containing the monomer and free radical initiator in the dropping funnel was added to the three-necked flask. The entire mixture was then heated to 70° C. for overnight (about 15 hours) and thereafter refluxed for 1 hour. After cooling to room temperature under an inert atmosphere, the modified carbon black pigment dispersion was adjusted from pH=2.55 to 7.5 by the addition of a 0.5 Molar potassium hydroxide solution (12.14 grams). The entire liquid mixture was centrifuged at 5500 R.P.M. for 30 minutes, after which the suspended liquid was removed and the settled pigment solid was washed and redispersed with 300 milliliters of distilled water. The resulting liquid mixture was washed and redispersed with a sonicator (10 minutes) to form a homogeneous carbon black dispersion. This dispersion contained about 47.4 percent by weight of the monomer used in the modification of carbon black pigment particles, indicating that about 47.4 percent by weight of the monomer initially added to the system ultimately became attached to the pigment.

VIC. Ink Preparation

A solution of ethylene glycol (humectant, 37.5 grams), Dowicil 200 (0.075 grams), and Duponol Me Dry (sodium lauryl sulfate, 3.75 grams of a 20 percent solution in water) was slowly added to 77.5 grams of the modified pigment dispersion of VIB above with stirring. The resulting ink mixture was sonicated for 10 minutes and centrifuged at 5500 R.P.M. for 30 minutes, after which the suspended liquid containing modified pigment particles was filtered through a 3 micron filter to result in an ink with a viscosity of 2.8 c.p.

EXAMPLE VII

An ink containing 4.67 percent by weight of carbon black particles having attached thereto a polymerized vinyl aromatic salt, 25 percent by weight of ethylene glycol, 0.5 percent of sodium lauryl sulfate, and 0.05 percent by weight of Dowicil 200 was prepared by the method of Example VIC except the ink's modified pigment particles were prepared with a monomer to initiator ratio of 13.0 percent by weight instead of 26.2 percent by weight as indicated in the first stage of polymerization in Example VIB. The ink exhibited a viscosity of 2.75 c.p. at 25° C. and the viscosity of this recording remained stable after at least 2 months storage.

EXAMPLE VIII

VIIIA. Attrition of Carbon Black Pigment with a Wetting Medium of an Organic Solvent To a jacketed attritor (modified Union Processes Company Model OV-1) was added slowly with stirring 1500 grams of ⅛ inch in diameter stainless steel shot, distilled water (125 grams), ethylene glycol (120 grams), and carbon black pigment (Raven 5250, 60 grams). The mixture was milled for 8 hours at a setting of 70 Volts. Additional water (195 grams) was then added to the attritor and the mixture was milled for 1 hour to form a homogeneous mixture. About 457.5 grams of the pigment dispersion was subsequently removed from the attritor (91.5 percent yield).

VIIIB. Pigment Modification Using a Two Stage Polymerization Process

To a three-necked flask equipped with a thermometer, a stirrer, a dropping funnel, a gas bubbler, and connections to vacuum and argon lines was added sodium para-styrene sulfonate salt (7.5 grams), potassium persulfate ($K_2S_2O_8$ initiator, 1.49 grams), and distilled water (150 grams). Pigment dispersion prepared as in VIIIA above (125 grams, containing 15 grams of carbon black) and distilled water (30 grams) were placed in the dropping funnel which was attached to the three-necked flask. The monomer mixture in the flask was stirred and degassed several times with vacuum evacuation and purging with argon and was then heated to 70° C. with stirring and held at that temperature for 4 hours before the addition of the carbon black dispersion mixture from the dropping funnel. After the addition of the carbon black dispersion into the flask, the mixture was heated at 70° C. for 15 hours and then at reflux temperature (about 103° C.) for 1 hour. After cooling in the inert atmosphere, the pH of the modified pigment mixture was adjusted from 4.0 to 7.3 by the addition of a 0.5 Molar potassium hydroxide solution (9.17 grams). Subsequently, the pigment mixture was centrifuged and decanted to remove the aqueous liquid layer from the solid. The solid pigment was then diluted with distilled water (300 grams) with stirring and centrifuged at 5500 R.P.M. for 30 minutes, followed by separating the liquid from the modified pigment solid to remove undesired water soluble impurities. The modified pigment was thereafter redispersed in distilled water to form a pigment dispersion (201.3 grams) which was ready for later preparation of ink. Based on the data of solid content in the removed aqueous liquid layer it was estimated that 21.7 percent of the monomer was grafted and/or adsorbed onto the carbon black pigment.

VIIC. Ink Preparation

A solution was prepared by mixing together ethylene glycol (37.5 grams), Dowicil 200 (0.075 gram), and a 20 percent solution of sodium lauryl sulfate in water (3.75 grams), and the solution was added slowly with stirring to 100.6 grams of the modified carbon black pigment dispersion prepared in VIIIB above. The resulting ink mixture was sonicated for 10 minutes and then centrifuged at 5500 R.P.M. for 30 minutes. The suspended pigmented ink was filtered through 5.0 micron and 1.2 micron filters, resulting in an ink with a viscosity of 2.8 c.p. as measured at 25° C. The viscosity of the ink was stable for at least 6 months.

VIIID. Preparation of an Ink Containing Modified Pigment Particles and a Dye

Food Black No. 2 Dye (obtained from Mobay Chemical Company, 1.0 gram) was added to 50 grams of the ink prepared in VIIIC above and the resulting ink was filtered through a membrane filter (0.65 micron pore size) to give an ink containing a dye.

VIIIE. Additional Ink Modification

A cyan dye (copper phthalocyanine-3,4',4'',4'''-tetrasulfonic acid tetrasodium salt (obtained from Aldrich Chemical Company, 0.15 gram) was added to 30 grams of the ink prepared in VIIID, and the resulting ink was filtered easily through a 0.65 micron filter.

EXAMPLE IX

Ink Preparation Process Employing Two Stage Polymerization Process for Modification of Pigment Particles To a three-necked flask equipped with a thermometer, a dropping funnel, a stirrer, a gas bubbler, and connections to vacuum and argon lines was added with stirring 125 grams of a carbon black pigment dispersion prepared as described in Example VIIIA above, a solution of sodium para-styrene sulfonate salt (3.75 grams of monomer), and potassium persulfate ($K_2S_2O_8$, 0.99 gram in 25 grams of distilled water). A similar aqueous solution containing sodium para-styrene sulfonate (3.75 grams) and potassium persulfate (free radical initiator, 0.99 gram) in distilled water (25 grams) was placed in the dropping funnel. After degassing and purging the system with vacuum and argon, the pigment mixture was heated to 80° C. for 4 hours, after which the monomer mixture in the dropping funnel was slowly added to the flask. The entire mixture was subsequently heated at 80° C. for overnight (about 15 hours). The pigment mixture was thereafter heated to reflux temperature for one hour. After adjusting the pH from 2.93 to 7.3 by the addition of a 0.5 Molar potassium hydroxide solution, the pigment mixture was centrifuged at 6000 R.P.M. for 40 minutes and the liquid layer was poured off from the solid. The modified solid pigment was then dispersed in distilled water to form a pigment dispersion (162.8 grams) which was suitable for the subsequent preparation of ink.

IXB. Ink Preparation

A solution containing ethylene glycol (37.5 grams), sodium lauryl sulfate (3.75 grams of a 20 percent sodium lauryl sulfate solution in water) and Dowicil 200 (0.075 gram) was slowly added with stirring to 81.4 grams of the pigment dispersion of IXB above. The mixture was then sonicated for 10 minutes and centrifuged at 5500 R.P.M. for 30 minutes. After the centrifugation, the suspended ink mixture was filtered through 5 micron and 1.2 micron filters to result in an ink.

EXAMPLE X

Chemically modified pigment dispersions were characterized to determine the percentage of the monomer polymerized (based on the weight of monomer used) and attached to the pigment as well as the weight percentage of monomer (vinyl aromatic salt, sodium parastyrene sulfonate) being polymerized or grafted onto the pigment based on the weight of carbon black pigment used. These values were determined by measuring the initial weight of unmodified pigment particles added, the weight of vinyl aromatic salt monomers initially added, and the weight of modified pigment particles formed. By subtracting the weight of unmodified pigment from the weight of modified pigment, the amount of monomer that polymerized and became attached to the pigment was determined. The weight percent of monomer polymerized and attached to the pigment was determined by dividing the weight of monomer that became attached to the pigment by the weight of monomer initially added to the system and multiplying by 100. The weight percent of monomer attached to the pigment represents the relative amounts of pigment and polymer in each particle; for example, 1.144 grams of the pigment dispersion of Example IC as shown in the first row of the table contains 1 gram of carbon black and 0.144 gram of polymerized vinyl aromatic salt. Table 1 contains this data for inks and dispersions prepared according to the indicated Examples herein.

TABLE 1

| Pigment Dispersion or Ink (Example No.) | Weight % monomer polymerized and atached to pigment (efficiency of monomer polymerized) | Weight % monomer attached to pigment (based on weight of pigment) |
| --- | --- | --- |
| IC | 48 | 14.4 |
| IVB | 44.6 | 13.4 |
| V | 44.6 | 13.4 |
| VII | 35.3 | 14.1 |
| IXB | 35.2 | 17.6 |

EXAMPLE XI

A thermal ink jet test fixture equipped with a 48 jet printhead with a resolution of 288 spi was employed for printing with inks of the present invention. The printhead was operated at 33.5 Volts with a pulse length of 3 microseconds. Images with several inks of the present invention were prepared on different plain papers and silica coated paper. Excellent sharp characters and graphics were obtained without feathering. Images prepared by the inks of the present invention were extremely waterfast and lightfast. Images were not destroyed if water was spilled on the imaged papers. Extremely dark images with high optical density were obtained. Some of the optical density data after the background correction are listed below in Table 2 for inks prepared according to the indicated Example herein. Dashed lines in the table represent papers for which no tests were done with the indicated ink. The papers listed are as follows:

TABLE 2

| Ink (Example No.) | Paper A | Paper B | Paper C | Paper D | Paper E | Paper F | Paper G | Paper H |
| --- | --- | --- | --- | --- | --- | --- | --- | --- |
| IIC | 1.46 | 1.41 | 1.47 | 1.45 | 1.42 | 1.43 | 1.43 | 1.68 |
| III | 1.23 | 1.30 | 1.25 | 1.27 | 1.19 | 1.23 | 1.32 | 1.52 |
| IVB | 1.38 | 1.41 | 1.37 | 1.37 | 1.40 | 1.41 | 1.46 | 1.58 |
| V | 1.42 | 1.43 | 1.44 | 1.46 | 1.39 | 1.37 | 1.36 | 1.54 |
| VII | 1.42 | 1.40 | 1.40 | 1.32 | 1.26 | — | 1.33 | — |
| VIIID | 1.39 | 1.33 | 1.41 | 1.30 | 1.25 | — | 1.34 | 1.72 |
| IXB | 1.31 | 1.34 | 1.34 | 1.35 | 1.30 | — | 1.31 | 1.68 |

Paper A Gilbert Bond
Paper B Strathmore Bond
Paper C Xerox 4024 DP Ashdown
Paper D Xerox 4200 DP Ashdown
Paper E Xerox 10 Series DP
Paper F Xerox 10 Series Smooth
Paper G Xerox Letterhead
Paper H Silica coated (Sharp Company)

EXAMPLE XII

Solid area and line images prepared on paper substrates with the inks of this invention exhibited electrical conductivity. A solid line image was generated with the test fixture described in Example XI on flexible paper substrates, with the solid image having dimensions of 1.65 centimeters (width)×12.9 centimeters (length) except as otherwise specified. Resistance was measured across the line with an Ohm meter and indicated as kilo ohm per centimeter, and the sheet resistivity was calculated in terms of kilo ohm per square centimeter area. Conductivity data for images on the papers indicated with inks prepared according to the indicated Example herein are contained in Table 3. The papers indicated are as in Example XI.

TABLE 3

| Ink (Example No.) | Paper A | | Paper C | | Paper F | | Paper H | |
| --- | --- | --- | --- | --- | --- | --- | --- | --- |
| | measured (KΩ/cm) | sheet (KΩ/cm²) | measured (KΩ/cm) | sheet (KΩ/cm²) | measured (KΩ/cm) | sheet (KΩ/cm²) | measured (KΩ/cm) | sheet (KΩ/cm²) |
| IC | 9.3 | 15.3 | 14.7 | 24.3 | 15.5 | 25.6 | 60 | 99 |
| VII | 8.8 | 14.6 | 10.1 | 16.6 | 19.8 | 32.6 | 20.9 | 24.5 |
| VIIID | 10.6 | 4.24† | 10.1 | 16.6 | 27.9 | 46 | 26.7 | 21.4* |
| IXB | 6.3 | 10.4 | 9.9 | 29.2 | 17.1 | 28.1 | 31.0 | 24.8* |

†solid area dimensions - 0.4 centimeter (width) × 12.9 centimeters (length)
*solid area dimensions - 0.8 centimeter (width) × 12.9 centimeters (length)

Other embodiments and modifications of the present invention may occur to those skilled in the art subsequent to a review of the information presented herein; these embodiments and modifications, as well as equivalents thereof, are also included within the scope of this invention.

What is claimed is:

1. An ink jet ink composition comprising an aqueous liquid vehicle which comprises water and a humectant and pigment particles having chemically grafted to the surfaces thereof a polymerized vinyl aromatic salt, said ink having a viscosity of 10 centipoise or less.

2. An ink jet ink composition according to claim 1 wherein the pigment is carbon black.

3. An ink jet ink composition according to claim 1 wherein the pigment particles are nonmutagenic nontoxic carbon black particles with a polyaromatic hydrocarbon content of less than about 1 part per million.

4. An ink jet ink composition according to claim 1 wherein the pigment is selected from the group consisting of cyan pigments, magenta pigments, yellow pigments, red pigments, blue pigments, green pigments, orange pigments, and mixtures thereof.

5. An ink jet ink composition according to claim 1 wherein the vinyl aromatic salt is of the formula

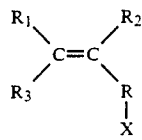

wherein R is an aromatic moiety, X is an acid salt functional group, and $R_1$, $R_2$, and $R_3$ are independently selected from the group consisting of hydrogen, alkyl groups, substituted alkyl groups, aromatic groups, substituted aromatic groups, heterocyclic groups, and substituted heterocyclic groups.

6. An ink jet ink compositon according to claim 1 wherein the humectant is selected from the group consisting of ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, and mixtures thereof.

7. An ink jet ink composition according to claim 1 wherein the liquid vehicle comprises water in an amount of from about 40 to about 97 percent by weight and a humectant in an amount of from about 3 to about 60 percent by weight.

8. An ink jet ink composition according to claim 1 wherein the pigment particles have an average particle diameter of from about 0.001 to about 10 microns.

9. An ink jet ink composition according to claim 1 wherein the pigment particles have an average particle diameter of less than about 1 micron.

10. An ink jet ink composition according to claim 1 wherein the pigment particles having the polymerized vinyl aromatic salt attached thereto are present in the ink composition in an amount of from about 0.1 to about 15 percent by weight.

11. An ink jet ink composition according to claim 1 wherein the vinyl aromatic salt is of the formula

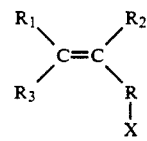

wherein R is an aromatic moiety with from 6 to about 20 carbon atoms, X is an acid salt functional group consisting of both cation and anion moieties, and $R_1$, $R_2$, and $R_3$ are independently selected from the group consisting of hydrogen, alkyl groups with from 1 to about 20 carbon atoms, aromatic groups with from 6 to about 20 carbon atoms, and heterocyclic groups.

12. An ink jet ink composition according to claim 11 wherein R is selected from the group consisting of phenyl, substituted phenyl, naphthyl, substituted naphthyl, anthracenyl, substituted anthracenyl, and heterocyclic aromatic rings.

13. An ink jet ink composition according to claim 11 wherein X is a salt functional group wherein the cation is selected from the group consisting of $Rb^+$, $Cs^+$, $K^+$, $Na^+$, $Li^+$, ammonium, and substituted ammonium, and the anion is selected from the group consisting of sulfonate, carboxylate, phosphate, and borate.

14. An ink jet ink composition according to claim 1 wherein the vinyl aromatic salt is of the formula

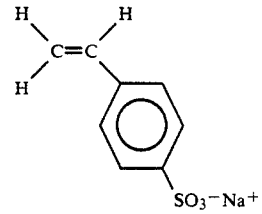

15. An ink jet ink composition according to claim 1 wherein the vinyl aromatic salt is a styrene sulfonate salt.

16. An ink jet ink composition according to claim 1 which also contains a dye.

17. An ink jet ink composition according to claim 16 wherein the dye is present in an amount of no more than about 15 percent by weight.

18. An ink jet ink composition according to claim 1 which also contains a dispersing agent selected from the group consisting of cationic dispersing agents, anionic dispersing agents, and nonionic dispersing agents.

19. An ink jet ink composition according to claim 18 wherein the dispersing agent is present in an amount of no more than about 40 percent by weight.

20. An ink jet ink composition according to claim 1 which also contains a water soluble polymeric additive.

21. An ink jet ink composition according to claim 20 wherein the polymeric additive is selected from the group consisting of Gum Arabic, polyacrylate salts, polymethacrylate salts, polyvinyl alcohols, polyethylene oxides, poyethylene glycols, polypropylene glycols, hydroxy propylcellulose, hydroxyethylcellulose; polyvinylpyrrolidinone, polyvinylether, starch, polyacrylamide, lignin sulfonate salts, copolymers of naphthalene sulfonate salts and formaldehyde, and polysaccharides.

22. An ink jet ink composition according to claim 20 wherein the polymeric additive is present in an amount of from about 0.01 to about 5 percent by weight.

23. An ink jet ink composition according to claim 1 wherein the ink has a viscosity of less than 5 centipoise.

24. An ink jet ink composition according to claim 1 wherein the ink has a viscosity of less than 3 centipoise.

25. An ink jet ink composition according to claim 1 wherein the ink also contains a biocide.

26. A process for preparing an ink composition suitable for ink jet printing processes which comprises mixing in water a pigment and a vinyl aromatic salt, attriting the mixture until the pigment particles have an average particle diameter of from about 0.001 to about 20 microns, adding to the mixture a water soluble free radical polymerization initiator and heating the mixture under vacuum or inert atmosphere, thereby polymerizing the vinyl aromatic salt and chemically grafting it to the pigment particle surfaces, separating the pigment particles from the mixture, and admixing the pigment particles with an aqueous liquid vehicle comprising water and a humectant to result in an ink having a viscosity of 10 centipoise or less.

27. A process according to claim 26 wherein subsequent to admixing the pigment particles with the liquid vehicle, the ink composition is subjected to centrifugation and filtration to remove pigment particles with an average particle diameter of greater than about 1 micron.

28. A process according to claim 26 wherein polymerization of the monomeric vinyl aromatic salt is carried out at a temperature of from about 20° to about 120° C.

29. A process according to claim 26 wherein the mixture of water, pigment, and monomeric vinyl aromatic salt is attrited for a period of from about 0.25 to about 28 hours.

30. A process according to claim 26 wherein prior to polymerization the mixture comprises water in an amount of from about 35 to about 98 percent by weight, pigment particles in an amount of from about 2 to about 65 percent by weight, monomeric vinyl aromatic salt in an amount of from about 0.02 to about 50 percent by weight, free radical polymerization initiator in an amount of from about 0.01 to about 15 percent by weight, and a wetting agent in an amount of from 0 to about 50 percent by weight.

31. A process according to claim 26 wherein the vinyl aromatic salt is of the formula

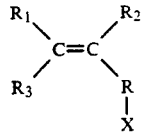

wherein R is an aromatic moiety, X is an acid salt functional group, and $R_1$, $R_2$, and $R_3$ are independently selected from the group consisting of hydrogen, alkyl groups, substituted alkyl groups, aromatic groups, substituted aromatic groups, heterocyclic groups, and substituted heterocyclic groups.

32. A process according to claim 31 wherein R is selected from the group consisting of phenyl, substituted phenyl, naphthyl, substituted naphthyl, anthracenyl, substituted anthracenyl, and heterocyclic aromatic rings.

33. A process according to claim 26 wherein the pigment particles having attached to the surfaces thereof the polymerized vinyl aromatic salts have an average particle diameter of from about 0.001 to about 10 microns.

34. A process according to claim 26 wherein the pigment particles having attached to the surfaces thereof the polymerized vinyl aromatic salts have an average particle diameter of less than about 1 micron.

35. A process according to claim 26 wherein the pigment particles having the polymerized vinyl aromatic salt attached thereto are present in the ink composition in an amount of from about 0.1 to about 15 percent by weight.

36. A process according to claim 26 wherein the vinyl aromatic salt is of the formula

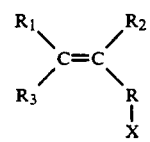

wherein R is an aromatic moiety with from 6 to about 20 carbon atoms, X is an acid salt functional group consisting of both cation and anion moieties, and $R_1$, $R_2$, and $R_3$ are independently selected from the group consisting of hydrogen, alkyl groups with from 1 to about 20 carbon atoms, aromatic groups with from 6 to about 20 carbon atoms, and heterocyclic groups.

37. A process according to claim 26 wherein the vinyl aromatic salt is of the formula

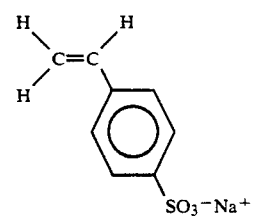

38. A process according to claim 26 wherein the vinyl aromatic salt is a styrene sulfonate salt.

39. A process for preparing an ink composition suitable for ink jet printing processes which comprises:
   a. preparing modified pigment particles by:
      i. first mixing together in water a free radical polymerization initiator and a monomeric vinyl aromatic salt and heating the mixture under vacuum or inert atmosphere, thereby polymerizing the vinyl aromatic salt; and
      ii. subsequently adding to the polymerized vinyl aromatic salt pigment particles with an average particle diameter of from about 0.001 to about 10 microns, additional vinyl aromatic salt monomers, and, optionally, additional free radical polymerization initiator, thereby further polymerizing the vinyl aromatic salt and resulting in chemical grafting of the polymerized vinyl aromatic salt to the surfaces of the pigment particles; and
   b. admixing the modified pigment particles thus prepared with an aqueous liquid vehicle comprising water and a humectant to result in an ink having a viscosity of 10 centipoise or less.

40. A process for preparing an ink composition suitable for ink jet printing processes which comprises:
   a. preparing modified pigment particles by:

i. first mixing together in water pigment particles with an average particle diameter of from about 0.001 to about 10 microns, a monomeric vinyl aromatic salt, and a free radical polymerization initiator and heating the mixture under vacuum or inert atmosphere, thereby polymerizing the vinyl aromatic salt; and ii. subsequently adding to the mixture additional vinyl aromatic salt monomers and, optionally, additional free radical polymerization initiator, thereby further polymerizing the vinyl aromatic salt, wherein the polymerized vinyl aromatic salt is chemically grafted to the surfaces of the pigment particles; and b. admixing the modified pigment particles thus prepared with an aqueous liquid vehicle comprising water and a humectant to result in an ink having a viscosity of 10 centipoise or less.

* * * * *